(12) United States Patent
Niessner et al.

(10) Patent No.: US 9,815,734 B2
(45) Date of Patent: Nov. 14, 2017

(54) SOLARIZATION-STABLE UV BAND-PASS FILTER

(71) Applicant: SCHOTT AG, Mainz (DE)

(72) Inventors: Lothar Niessner, Duingen (DE); Ralf Biertuempfel, Mainz-Kastel (DE)

(73) Assignee: SCHOTT AG, Mainz (DE)

( * ) Notice: Subject to any disclaimer, the term of this patent is extended or adjusted under 35 U.S.C. 154(b) by 40 days.

(21) Appl. No.: 14/965,925

(22) Filed: Dec. 11, 2015

(65) Prior Publication Data

US 2016/0168016 A1    Jun. 16, 2016

(30) Foreign Application Priority Data

Dec. 12, 2014 (DE) .......................... 10 2014 118562

(51) Int. Cl.
    *C03C 4/08*        (2006.01)
    *C03C 3/087*     (2006.01)
    *C03C 3/091*     (2006.01)
    *C03C 4/00*        (2006.01)
    *C03C 3/108*     (2006.01)

(52) U.S. Cl.
    CPC ............ *C03C 4/0085* (2013.01); *C03C 3/087* (2013.01); *C03C 3/091* (2013.01); *C03C 3/108* (2013.01); *C03C 4/08* (2013.01)

(58) Field of Classification Search
    CPC ......... C03C 3/085; C03C 3/087; C03C 3/091; C03C 3/093; C03C 3/105; C03C 3/108; C03C 4/0085; C03C 4/02; C03C 4/08
    See application file for complete search history.

(56) References Cited

U.S. PATENT DOCUMENTS

| | | | | |
|---|---|---|---|---|
| 2,693,422 A | * | 11/1954 | Duncan | .................... C03C 1/10 501/71 |
| 4,820,326 A | | 4/1989 | Speit | |
| 5,242,869 A | * | 9/1993 | Tarumi | ..................... C03C 1/10 501/56 |
| 2001/0025004 A1 | * | 9/2001 | Seto | ........................ C03C 4/085 501/127 |
| 2013/0128434 A1 | * | 5/2013 | Yamamoto | ............. C03C 3/085 361/679.01 |

FOREIGN PATENT DOCUMENTS

| | | | | |
|---|---|---|---|---|
| DE | 3643421 A1 | 6/1988 | | |
| EP | 0522859 A2 | 1/1993 | | |
| JP | 61106438 A | * 5/1986 | | ............. C03C 4/085 |
| JP | H06279051 A | 10/1994 | | |

* cited by examiner

*Primary Examiner* — Elizabeth A Bolden

(74) *Attorney, Agent, or Firm* — Ohlandt, Greeley, Ruggiero & Perle, L.L.P.

(57) ABSTRACT

Optical glass filters are provided that include a filter glass showing an optimized transmission spectrum which has a high transmission in the wave length range of 300 to 400 nm and a very low transmission in the visible wave length range. The glass has an especially high optical quality and is excellently suitable as an optical filter for generating UV light without a proportion of visible light. The optical glass filters include the components nickel oxide and cobalt oxide.

19 Claims, 3 Drawing Sheets

SOLARIZATION-STABLE UV BAND-PASS FILTER

CROSS REFERENCE TO RELATED APPLICATIONS

This application claims benefit under 35 U.S.C. §119(a) of German Patent Application No. 10 2014 118 562.5 filed Dec. 12, 2014, the entire contents of which are incorporated herein by reference.

BACKGROUND OF THE INVENTION

1. Field of the Invention

This invention relates to optical glass filters comprising a filter glass which shows an optimized transmission spectrum with high transmission in the wave length range of 300 to 400 nm and very low transmission in the visible wave length range. The glass is characterized by an especially high optical quality and is excellently suitable as optical filter for generating UV light without a proportion of visible light.

2. Description of Related Art

Glass filters are known from prior art. So for example the document DE 3 643 421 A1 describes lead- and tin-containing glasses which are used in the case of filtering of UV light sources in the emission range of 200-1100 nm. In this document also the solarization—thus the influence of long-lasting UV irradiation onto the adsorption properties—is described. Lead and tin oxide are used for decreasing the tendency to solarization. Due to its ecologically damaging properties today lead is still no longer accepted in filter glasses. The difference of the glasses of the present invention and the glasses described in this mentioned document is that in the glasses of the present invention colored oxides in special ratios are used which results in advantageous transmission properties and solarization stability even without the use of lead and tin.

EP 0 522 859 A2 describes different filter glasses wherein the glass mentioned in the abstract as the second glass already due to its content of silica is considerably different from the glasses which are used in the present invention. Also the glass mentioned as the first glass in this document is different from the glasses which are used in the filter of the present invention. The glasses mentioned in this document comprise copper halides in a proportion of at least 0.05% by weight. Allegedly, the other components in the glass are not of importance. The glasses described are allowed to contain lead in considerable amounts. The relevance of the use of the colored components nickel oxide and cobalt oxide has not been understood. The amounts of boron oxide used are very high.

JP H0-6279057 A describes glasses which do not comprise the necessary proportions of the colored components nickel oxide and cobalt oxide. In addition, the content of lithium oxide and sodium oxide is relatively high which compromises the chemical resistance.

SUMMARY

Based on prior art it was the object to provide optical glass filters having a superior filtering effect and being characterized at the same time by good solarization stability. The glass filters according to the present invention solve this object by a special filter glass.

DETAILED DESCRIPTION

Figure 1:
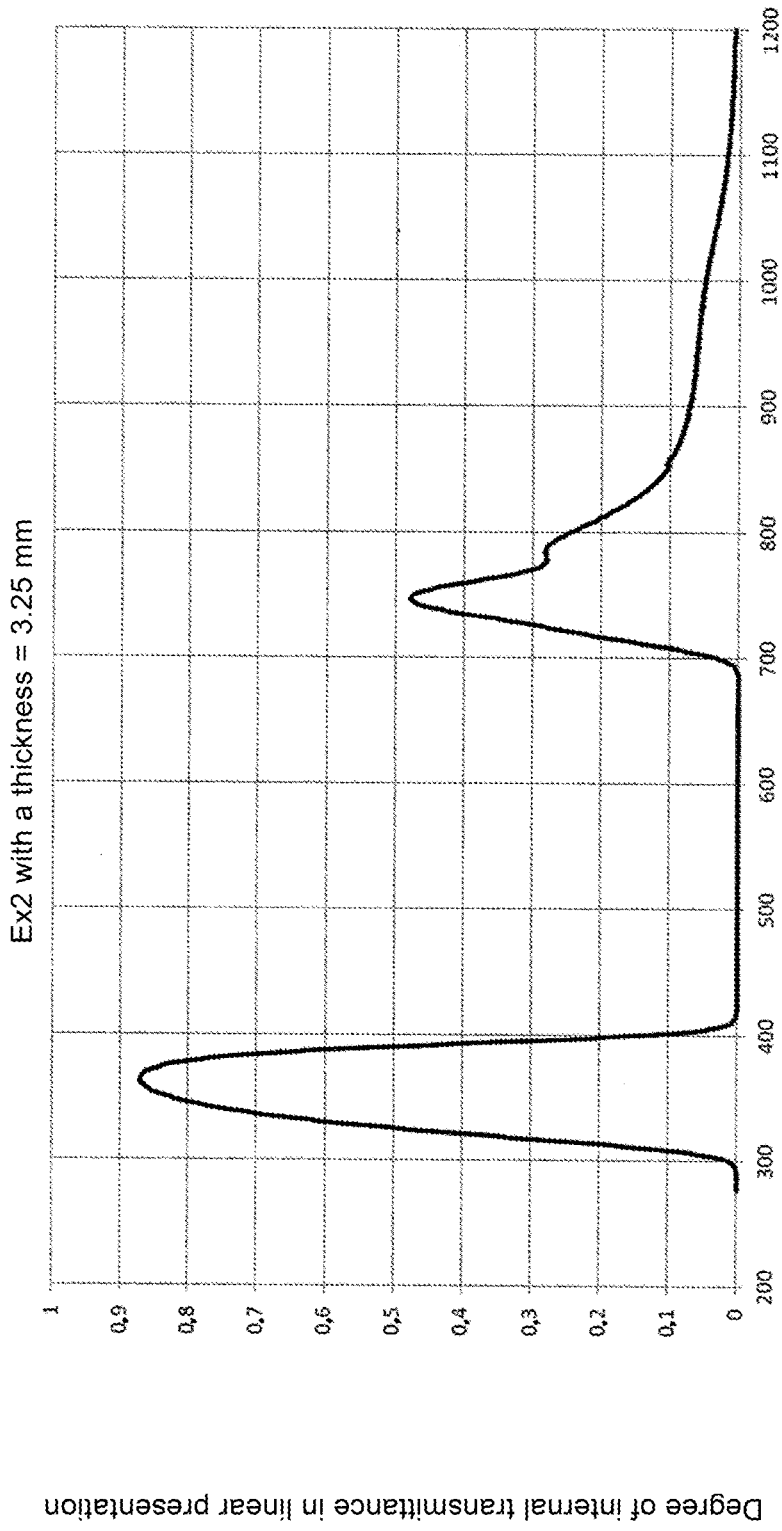
FIG. 1 shows the spectrum of the internal transmittance of example glass Ex2.

The invention relates to optical glass filters comprising a filter glass which comprises the following composition (in % by weight, on the basis of oxides):

| | |
|---|---|
| $SiO_2$ | 45-75 |
| $B_2O_3$ | 0-5 |
| $Al_2O_3$ | 0-5 |
| $Na_2O$ | 0.3-15 |
| $K_2O$ | 2-20 |
| CaO | 0-15 |
| BaO | 0-15 |
| $TiO_2$ | 0-5 |
| CoO | 0.01-3 |
| NiO | 0.1-8 |
| PbO | <7 | wherein the mass ratio of NiO to CoO is at least 3.

According to the present invention, the ratio of the amounts of nickel oxide to cobalt oxide is essential for adjusting the advantageous absorption properties of the filter glass. Compared to the glasses of prior art the filter glasses in the optical glass filter have advantageous transmission properties. These advantageous transmission and/or absorption properties become evident in the form of a transmission in the visible wave length range of 450 nm to 650 nm of preferably lower than $10^{-4}$, in particular lower than $10^{-5}$ and preferably lower than $10^{-6}$ at a glass thickness of 3.25 mm. The maximum transmission is achieved at a wave length of 340 to 375 nm, in particular at 363±5 nm. The so-called absorption edges are the wave lengths at which the internal transmittance is 50%. In the case of the filter glass according to the present invention they are preferably 325 nm±15 nm (UVA) and 389±15 nm (blue). The absorption edges are of particular importance for many technical uses. Therefore, a close toleration of the edge is advantageous for the customer. The edges define the exact dividing line between the absorbing ranges and the transmission range.

In the case of filter glass for the description of the optical properties the calculation of the so-called diabatie $\theta(\lambda)$ has become established:

$$\theta(\lambda)=1-\log(\log(1/\tau_i(\lambda))),$$

wherein $\tau_i(\lambda)$ is the wave length-dependent internal transmittance.

When the transmissions of filters are considered, then not only their transmittance values have to be taken into account, but also the proportions of the radiation which are reflected at the boundary surfaces. The degree of the internal transmittance is defined as the ratio of the spectral radiant flux arriving at the exit surface to the spectral radiant flux entered into the filter. The glass according to the present invention at the transmission maximum of 363 nm has preferably a diabatie value $\theta(363\ nm)$ which is at least two numerical values higher than the diabatie values between 450 nm and 650 nm, i.e., in particular, the following should be true:

$$\theta(363\ nm)-\theta(450\ nm)>2$$

$$\theta(363\ nm)-\theta(650\ nm)>2$$

(These two inequalities do not depend on the thickness of the filter glass.)

According to the present invention the mass ratio of nickel oxide to cobalt oxide is preferably higher than 4, further preferably higher than 4.3. But when the ratio is too high—thus very much nickel oxide in relation to cobalt oxide is used—negative effects with respect to the transmission can be the consequence. Therefore, this ratio should preferably not exceed a value of 14, further preferably 8, further preferably 6, more preferably 5.7 and particularly preferably 5.

For the adjustment of the transmission behavior the filter glasses described here contain the two spectrally absorbing components cobalt oxide and nickel oxide. According to the present invention, "cobalt oxide" preferably means the species CoO. "Nickel oxide" preferably means the species NiO.

The content of cobalt oxide is at least 0.01% by weight, further preferably at least 0.1% by weight, more preferably at least 0.2% by weight and particularly preferably at least 0.3% by weight. When the content is too low, then the required absorption in the spectral range of green to red cannot be achieved. The content of cobalt oxide should not exceed a value of 3% by weight, preferably 2% by weight, more preferably 1% by weight and particularly preferably 0.6% by weight. When the amount of cobalt oxide is too high, then the edge in the red spectral range is shifted to longer wave lengths.

Cobalt oxide is characterized by absorption in the spectral range of green to red from ca. 500 to 700 nm, while nickel oxide shows absorption in the spectral range of blue to green from ca. 400 to ca. 550 nm.

With respect to the component nickel oxide it is true that according to the present invention a content of at least 0.1% by weight is necessary for achieving the advantageous transmission properties—thus the absorption in the blue spectral range. In preferable embodiments the content of nickel oxide is at least 0.25% by weight, further preferably at least 1% by weight and particularly preferably at least 1.4% by weight. But the content of nickel oxide should also not be too high, because otherwise the spectral edge in the blue range would be less steep. In particular, the content of nickel oxide in the filter glass is at most 8% by weight, preferably at most 5% by weight, further preferably at most 4% by weight and particularly preferably at most 2.5% by weight.

For not compromising the transmission properties of the filter glass, the content of the two components nickel oxide and cobalt oxide in sum should not exceed a value of 8% by weight; preferably this content should not exceed a value of 6% by weight, further preferably 5% by weight, more preferably 4% by weight and particularly preferably 2.5% by weight. Nevertheless, a minimum proportion of 0.2% by weight, further preferably at least 0.6% by weight, more preferably at least 1% by weight and particularly preferably at least 1.5% by weight should be used.

The selection of the spectrally absorbing oxides as well as the glass composition in total result in advantageous solarization stability. The reason for that is that the UV radiation causing solarization penetrates into the filter glass in an appreciable amount only in a narrow wave length range of ca. 325 to 389 nm. In the range of shorter wave lengths which anyway cause higher solarization damage a proportion of $TiO_2$ which is preferably also contained in the glass provides for additional UV absorption.

It is preferred according to the present invention that the filter glass indeed comprises the two spectrally absorbing oxides nickel oxide and cobalt oxide, but is free of further absorbing oxides selected from manganese, iron, chromium, copper and cerium. Furthermore, in preferable embodiments the glass is free of lanthanum, yttrium, gadolinium, ytterbium and/or zirconium, in particularly of their oxides. In addition, in preferable embodiments the glass is free of tin oxide, lithium oxide, fluoride, magnesium and/or $SO_3$. When $SO_3$ is used, then it is possible that nickel sulfide is generated which would result in uselessness of the filter glass. The glass may contain small amounts of Cl, in particularly at least 0.02% by weight, preferably at least 0.1% by weight; but preferably at most 1% by weight or at most 0.5% by weight. This component serves as a refining agent and also for the improvement of the melting behavior. Cl can be added in the form of sodium chloride.

When in this description is mentioned that the filter glass does not contain a component and/or that the filter glass is free of a certain component, then this means that this component is not added to the glass in a targeted manner and that it is preferably only present in the filter glass as an impurity in a content of not higher than 50 ppm, further preferably not higher than 30 ppm, more preferably not higher than 10 ppm and particularly preferably not higher than 1 ppm.

When in this application percentages are mentioned, then they relate to % by weight, unless otherwise specified. Information referring to a ratio or a ratio of amounts relates to mass ratios, unless otherwise specified.

The filter glass in the optical filter of this invention comprises silica ($SiO_2$) in a proportion of at least 45% by weight. Silica is a network-forming agent. It provides the required chemical resistance and is used for the adjustment of the viscosity properties. In preferable embodiments the content of silica in the filter glasses is at least 55% by weight and particularly preferably at least 65% by weight. On the other hand, silica also increases the melting point as well as the processing temperature of the filter glass, and this increases the energy consumption during the production. So that this energy consumption does not become too high, the content of silica is restricted to 75% by weight, preferably 71% by weight.

The filter glass in the optical glass filter of this invention may comprise boron oxide in amounts of up to 5% by weight. Boron oxide is a network-forming agent which results in a positive influence onto the chemical resistance. But recently concerns with respect to the use of boron oxide as a raw material due to the carcinogenicity thereof arose which complicates the use of this component in the production of filter glasses. Therefore, preferably the content of this component is as low as possible. Therefore, in preferable embodiments the content of boron oxide in the filter glass is limited to at most 3% by weight, further preferably at most 2% by weight and particularly preferably at most 1.5% by weight or at most 0.5% by weight. Nevertheless, certain embodiments may comprise boron oxide in a proportion of at least 0.01% by weight or at least 0.1% by weight. Certain embodiments may be free of boron oxide.

The filter glasses used according to the present invention may comprise aluminum oxide. Aluminum oxide is contained in the filter glass in amounts of at most 5% by weight. Aluminum oxide increases the chemical resistance of the filter glass. But aluminum oxide also increases the melting point, so that the content thereof should not be too high. Preferable embodiments comprise aluminum oxide in amounts of at most 3% by weight, more preferably at most 2% by weight. It was shown that it is advantageous, when at least 0.5% by weight, more preferably at least 1% by weight of aluminum oxide is used in the filter glass.

The filter glasses used according to the present invention may comprise sodium oxide in amounts of up to 15% by weight. Sodium oxide reduces the processing temperature of the filter glasses, but when too high amounts thereof are used, it compromises the chemical resistance of the glasses. In preferable embodiments the content of sodium oxide is limited to at most 13.5% by weight. Preferable embodiments contain relatively high amounts of sodium oxide, namely preferably at least 5% by weight, further preferably at least 7% by weight and particularly preferably at least 9% by weight.

In particularly preferable embodiments the content of sodium oxide is higher than the content of potassium oxide in the filter glass. According to the present invention, the filter glass contains potassium oxide in amounts of at least 2% by weight. Like sodium oxide also the use of potassium oxide results in a reduction of the processing temperature of the filter glass. When an amount of potassium oxide is used which is too high, then this also results in a reduction of the chemical resistance of the filter glass, so that according to the present invention the content of potassium oxide is limited to at most 20% by weight, preferably at most 15% by weight, more preferably at most 10% by weight and particularly preferably at most 9% by weight. However a certain proportion of potassium oxide has an advantageous effect, so that in preferable embodiments potassium oxide is used in amounts of at least 3.5% by weight or at least 4% by weight.

Within certain limits the alkali metal oxides sodium oxide, potassium oxide and lithium oxide are interchangeable. Since lithium oxide can compromise the chemical resistance and the crystallization stability of the filter glass in the strongest manner, lithium oxide is preferably used in amounts of not higher than 3% by weight, further preferably not higher than 1% by weight. Advantageous embodiments are free of lithium oxide. Preferably, besides the three mentioned alkali metal oxides the filter glass does not contain further alkali metal oxides.

In preferable embodiments the filter glass preferably consists of at least 90% by weight, further preferably at least 95% by weight, more preferably at least 98% by weight and particularly preferably at least 99% by weight of the components mentioned here. According to one embodiment the glass consists of 90% by weight, preferably 95% by weight, more preferably 98% by weight of the components $SiO_2$, $B_2O_3$, $Al_2O_3$, $Na_2O$, $K_2O$, $CaO$, $PbO$, $BaO$, $TiO_2$, $Sb_2O_3$ $As_2O_3$, $NiO$, $CoO$ and $Cl$.

For guaranteeing optimum properties of the filter glass with respect to the processing and hydrolytic stability thereof it was shown that it is advantageous to restrict the sum of the alkali metal oxides to at most 25% by weight, further preferably at most 21% by weight and particularly preferably at most 18% by weight. For achieving the desired properties with respect to the processing temperature the content of alkali metal oxides should preferably be a value of at least 9% by weight, further preferably at least 12% by weight and particularly preferably at least 15% by weight.

The alkaline earth metal oxides barium oxide, calcium oxide and magnesium oxide as well as optionally strontium oxide can be used for adjusting the viscosity of the filter glass as well as also for reducing the melting temperature thereof. The use of alkaline earth metal oxides does not compromise the chemical resistance of the filter glass in such a great extent as the use of alkali metal oxides. Therefore, according to the present invention preferably alkaline earth metal oxides are used in the present glass in amounts which are preferably at least 5% by weight, further preferably at least 7% by weight and particularly preferably at least 9% by weight. But the content thereof should not exceed a value of 15% by weight, preferably 13% by weight and particularly preferably 11.5% by weight, so that the chemical resistance thereof is not compromised too much.

The filter glass may comprise calcium oxide in amounts of up to 15% by weight. In preferable embodiments the filter glasses comprise calcium oxide in amounts of at most 13% by weight, further preferably at most 8% by weight and particularly preferably at most 5% by weight. Calcium oxide is preferably used in amounts of at least 1.5% by weight, further preferably at least 2.75% by weight, more preferably at least 4% by weight and particularly preferably at least 5% by weight. It was shown that calcium oxide is a particularly suitable alkaline earth metal oxide for the filter glasses of this invention. In particular the reduction of the chemical resistance through this component is less distinct than for example in the case of magnesium oxide or strontium oxide. Due to this reason the glasses of the present invention are preferably even free of magnesium oxide and/or strontium oxide. In other embodiments the amount of magnesium oxide in the filter glasses according to the present invention is reduced to at most 2% by weight, further preferably at most 1.5% by weight and particularly preferably at most 1% by weight. In some embodiments of this invention the filter glasses contain strontium oxide in amounts of at most 1% by weight.

The glasses of this invention contain barium oxide in amounts of at most 15% by weight. Barium oxide was shown to be particularly advantageous with respect to the reduction of the processing temperature and the impairment of the chemical resistance. Due to this reason the content of barium oxide of the filter glasses used according to the present invention is preferably higher than the content of calcium oxide (based on the mass). In preferable embodiments the filter glasses contain barium oxide in amounts of at least 0.1% by weight, further preferably at least 3% by weight, more preferably at least 5% by weight and particularly preferably at least 6% by weight. Nevertheless, the content of barium oxide should not be selected too high. In preferable embodiments the content of this component is therefore limited to at most 12% by weight, further preferably at most 10% by weight and particularly preferably at most 9% by weight.

It was surprising, that the filter glasses which are used in the optical color filter according to the present invention have shown to be characterized by good solarization resistance, in particular in the view of the fact that only a low amount of or no lead oxide is used in these glasses. According to one embodiment after an irradiation of 7 hours with a UV lamp, in particular with a standard F400 lamp with 450 W and a distance of 14 cm the maximum degree of internal transmittance of the optical filter according to the present invention is reduced in an extent of less than 7%, preferably less than 5%, most preferably less than 3% (at a thickness=3.25 mm). For supporting the solarization stability of the glasses preferably titanium oxide is used in amounts of up to 5% by weight. On the one hand, titanium oxide protects the glass by UV absorption from solarization, but on the other hand it compromises the transmission properties and the crystallization stability. Due to this reason the content of this component is preferably reduced to at most 2.5% by weight, further preferably at most 1.5% by weight. In particularly advantageous embodiments titanium oxide is used in amounts which are at least 0.01% by weight, further preferably at least 0.1% by weight, more preferably at least 0.3% by weight and particularly preferably at least 0.4% by weight.

In glasses of prior art often lead oxide is used for increasing the solarization stability of the filter glasses. Today, lead oxide is not accepted due to health and environment protection reasons. The glasses in the optical filters of the present invention do only need very low amounts of or nearly no lead oxide. The content of lead oxide in the glasses according to the present invention is limited to amounts of at most 7% by weight, preferably at most 2.5% by weight, more preferably at most 2% by weight and particularly preferably at most 1% by weight. Particularly preferable embodiments are free of lead oxide.

The spectrally absorbing components nickel oxide and cobalt oxide with their absorption properties support the increase of the solarization stability of the filter glasses. For guaranteeing an optimum balance of the solarization stability in view of the transmission of the glasses it is important that the sum of the contents of lead oxide and cobalt oxide is preferably lower than the content of nickel oxide in the filter glasses.

In glasses of prior art often arsenic oxide is used as a refining agent. Due to the toxicity of this component it is preferable that the content of arsenic oxide in the glasses of this invention is not higher than 0.1% by weight. Preferably, the glasses of this invention are free of arsenic oxide. As refining agents the glasses may comprise antimony oxide or other refining agents in amounts of 0.1 to 0.5% by weight.

The glass according to the present invention may contain common refining agents in low amounts. Preferably, the sum of the refining agents added is at most 1.0% by weight, more preferably at most 0.5% by weight. As refining agent in the glass according to the present invention at least one of the following components may be contained (in % by weight):

| $Sb_2O_3$ | 0-1 and/or |
|---|---|
| $As_2O_3$ | 0-1 and/or |
| SnO | 0-1 and/or |
| $SO_4^{2-}$ | 0-1 and/or |
| inorganic peroxides | 0-1 |

As inorganic peroxides for example zinc peroxide, lithium peroxide and/or alkaline earth peroxides may be used.

According to one embodiment of the present invention the glass is free of $As_2O_3$, since due to ecological reasons this component is considered as problematic.

According to one embodiment of the present invention the glass according to the present invention is preferably also free of other components which are not mentioned in the claims or the description; i.e., according to such an embodiment the glass essentially consists of the above-mentioned components $SiO_2$, $B_2O_3$, $Al_2O_3$, $Na_2O$, $K_2O$, CaO, PbO, BaO, $TiO_2$, $Sb_2O_3$, $As_2O_3$, NiO, CoO and Cl, wherein single components which are described as not or less preferable components may be excluded. In this case the term "essentially consists of" means that other components are only present as impurities, but that they are not intentionally added to the glass composition as a single component.

The filter glasses used according to the present invention have refractive indexes $n_d$ of preferably 1.5 to 1.7. The glass-transition temperature Tg is preferably at least 450° C. and at most 750° C., in particular at most 650° C. The density of the filter glasses is preferably only about 2.3 to 2.8 g/cm$^3$. The coefficient of thermal expansion $\alpha_{20° C./300° C.}$ is preferably at most $1.1*10^{-5}$/K; particularly preferably at most $0.9*10^{-5}$/K. Hereby the glass is particularly suitable for use at high temperatures. In addition, the glass can be thermally tempered.

The optical filter according to the present invention is especially poor of streaks, in particular it is characterized by a streak class according to ISO 10110 of at least 4, preferably 5. The streak class according to MIL-G-147B is preferably at least B, more preferably A. Streaks are fluctuations of the refractive index in the glass with short range. Streaks can be classified according to ISO 10110 part 4.

EXAMPLES

The glasses mentioned in the following table were used in an optical filter according to the present invention (data are in % by weight).

|  | Ex 1 | Ex 2 | Ex 3 | Ex 4 | Ex 5 | Ex 6 | Ex 7 | Ex 8 | Ex 9 | Ex 10 |
|---|---|---|---|---|---|---|---|---|---|---|
| $SiO_2$ | 68.00 | 68.00 | 69.76 | 70.10 | 68.00 | 68.00 | 68.00 | 68.00 | 68.00 | 68.00 |
| $B_2O_3$ | 0 | 0 | 1.50 | 1.00 | 0 | 0 | 0 | 0 | 0 | 0 |
| $Al_2O_3$ | 1.50 | 1.50 | 1.00 | 1.00 | 1.50 | 1.50 | 1.50 | 1.50 | 1.50 | 1.50 |
| $Na_2O$ | 12.20 | 12.10 | 9.73 | 10.00 | 12.10 | 12.10 | 12.10 | 12.10 | 12.10 | 12.10 |
| $K_2O$ | 4.70 | 4.70 | 6.13 | 6.30 | 4.63 | 4.70 | 4.70 | 4.70 | 4.70 | 4.70 |
| CaO | 3.00 | 3.02 | 4.99 | 11.40 | 6.35 | 6.35 | 5.65 | 5.65 | 3.02 | 3.02 |
| PbO | 0 | 0 | 3.99 | 0 | 0 | 0 | 0 | 0 | 0 | 0 |
| BaO | 7.20 | 7.20 | 0 | 0 | 6.20 | 6.20 | 6.20 | 6.20 | 7.20 | 7.20 |
| $TiO_2$ | 1.20 | 0.60 | 0.28 | 0 | 0 | 0.12 | 1.90 | 1.00 | 0.60 | 0.70 |
| $Sb_2O_3$ | 0.30 | 0.30 | 0.22 | 0 | 0 | 0.30 | 0 | 0 | 0.30 | 0.30 |
| CoO | 0.400 | 0.384 | 0.430 | 0.900 | 0.136 | 0.136 | 0.033 | 0.033 | 0.384 | 0.384 |
| NiO | 1.800 | 1.743 | 1.950 | 4.000 | 0.737 | 0.737 | 0.401 | 0.401 | 1.743 | 1.743 |
| Cl | 0.35 | 0.35 | 0 | 0 | 0.05 | 0.20 | 0.05 | 0.05 | 0.35 | 0.35 |
| $As_2O_3$ | 0 | 0 | 0 | 0.2 | 0 | 0 | 0 | 0 | 0 | 0 |
| NiO/CoO | 4.5 | 4.53 | 4.53 | 4.44 | 5.42 | 5.42 | 12.2 | 12.2 | 4.53 | 4.53 |

FIG. 1 shows the spectrum of the internal transmittance of example glass Ex2 with a thickness of 3.25 mm. It can be seen that this filter glass is characterized by nearly complete absorption in the wave length range of 400 to 700 nm and very good internal transmittance values in the UVA range.

Figure 2:
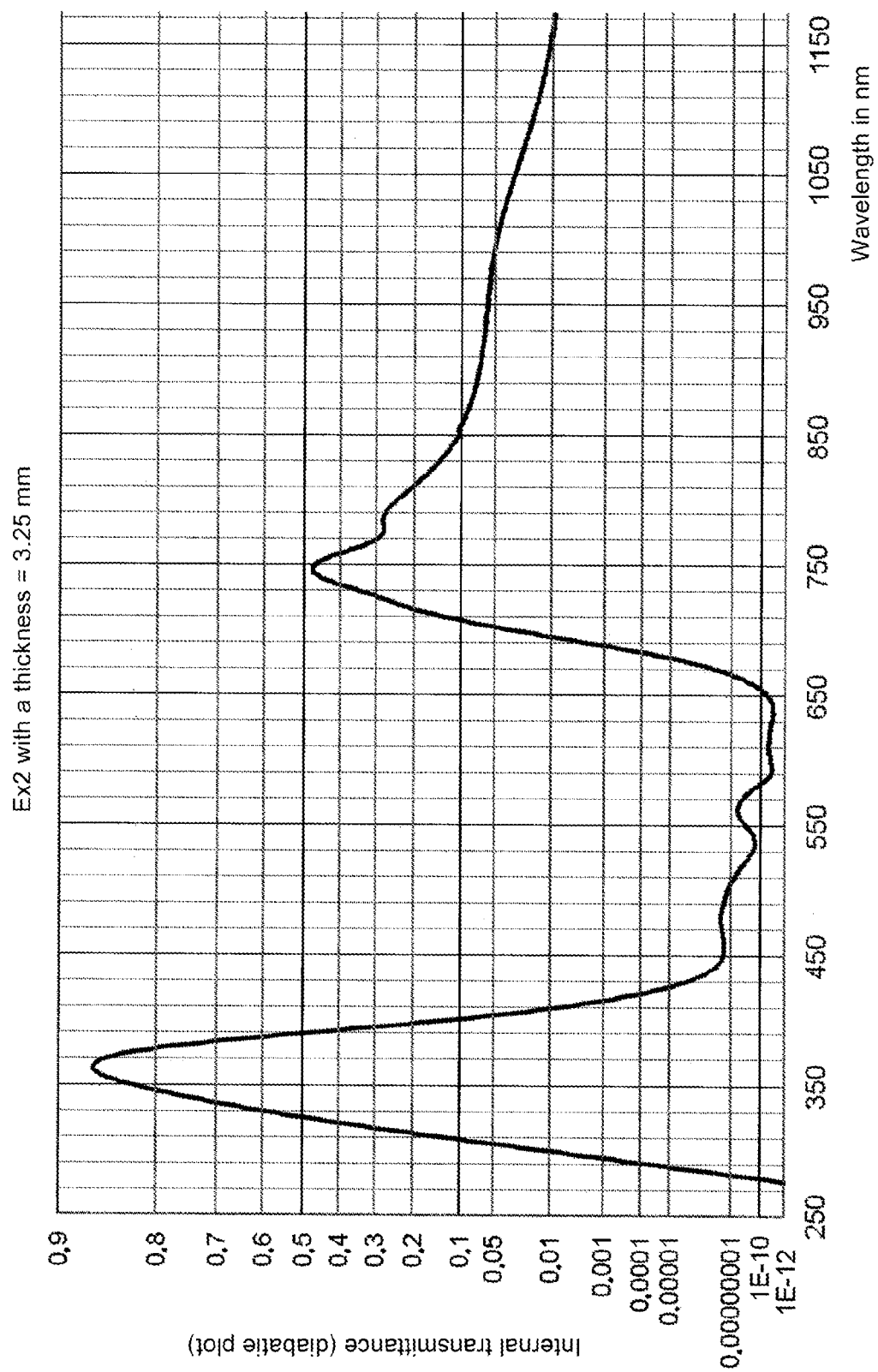
FIG. 2 shows the same values as in FIG. 1 in a diabatie plot.

FIG. 2 shows the same values as in FIG. 1 in a diabatie plot.

Figure 3:
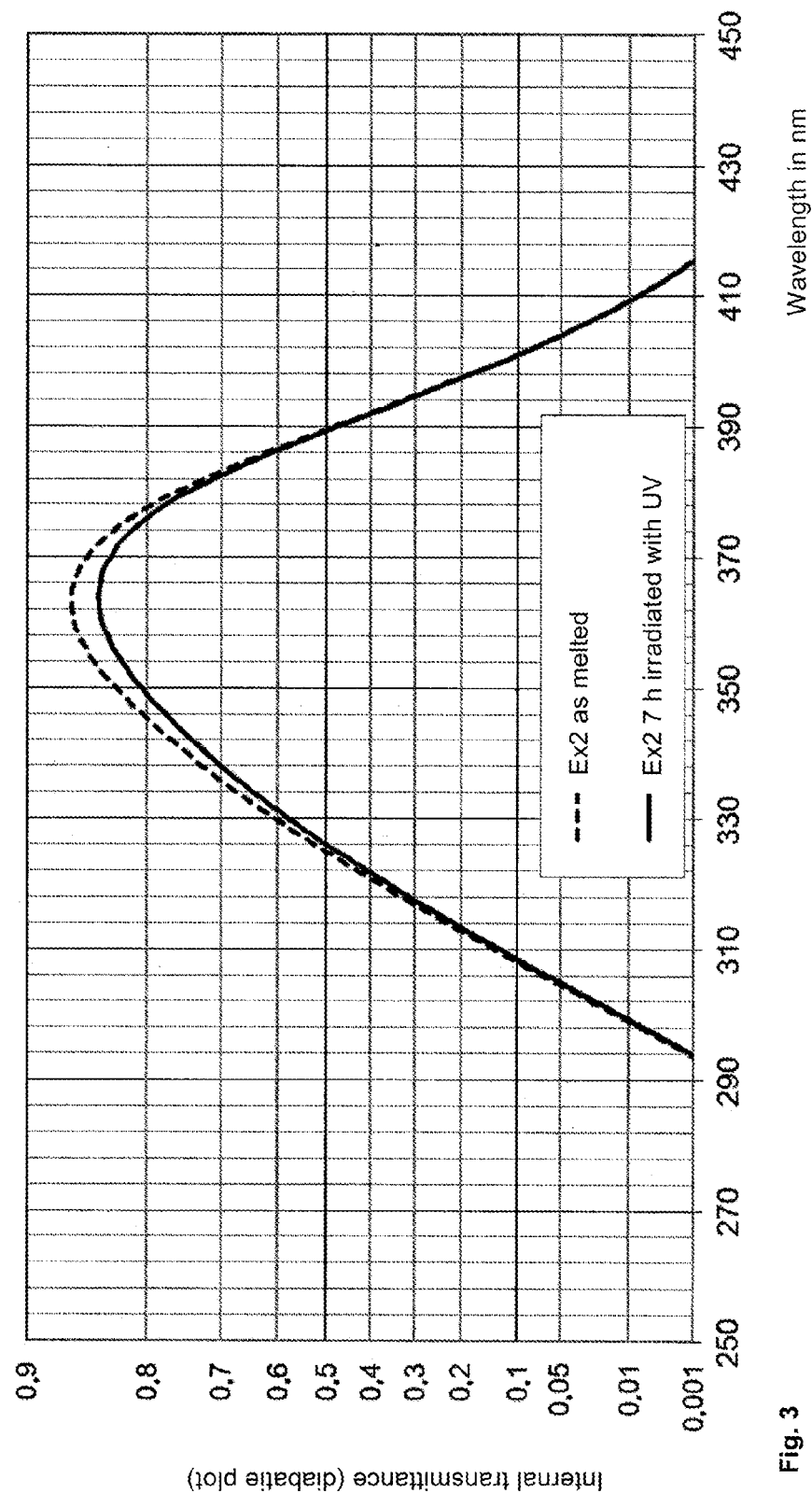
FIG. 3 shows the properties of an optical filter according to the present invention (with filter glass Ex2) prior and after an irradiation with a UV lamp for 7 hours.

FIG. 3 shows the properties of an optical filter according to the present invention (with filter glass Ex2) prior and after an irradiation with a UV lamp for 7 hours. The extent of the reduction of the maximum degree of internal transmittance is less than 3% (at a thickness=3.25 mm), or in other words: the maximum diabatie value is reduced in an extent of less than 0.09.

What is claimed is:

1. An optical glass filter, comprising a filter glass including following composition (in % by weight, based on oxides):

| | |
|---|---|
| $SiO_2$ | 45-75; |
| $B_2O_3$ | 0-5; |
| $Al_2O_3$ | 0-5; |
| $Na_2O$ | 0.3-15; |
| $K_2O$ | 2-20; |
| CaO | 0-15; |
| BaO | 0-15; |
| $TiO_2$ | 0.01-5; |
| CoO | 0.01-3; |
| NiO | 0.1-8; and |
| PbO | <7, and | a ratio of amounts of NiO to CoO that is at least 3.

2. The optical glass filter according to claim 1, comprising a difference of diabatie at wavelengths 363 nm and 450 nm that is higher than 2:

$$\theta(363\ nm)-\theta(450\ nm)>2.$$

3. The optical glass filter according to claim 2, comprising a difference of diabatie at wavelengths 363 nm and 650 nm that is higher than 2:

$$\theta(363\ nm)-\theta(650\ nm)>2.$$

4. The optical glass filter according to claim 1, wherein the filter glass comprises a sum of NiO and CoO that is at most 5% by weight.

5. The optical glass filter according to claim 1, wherein the filter glass comprises ZnO in a proportion of at most 3% by weight.

6. The optical glass filter according to claim 1, wherein the filter glass comprises iron in a proportion of less than 0.1% by weight.

7. The optical glass filter according to claim 1, wherein the filter glass comprises alkali metal oxides in a proportion of at least 13% by weight.

8. The optical glass filter according to claim 1, wherein the filter glass comprises BaO in a proportion of at most 10% by weight.

9. The optical glass filter according to claim 1, wherein the filter glass is free of absorbing oxides of an element selected from the group consisting of manganese, iron, chromium, copper, and cerium, free of an element selected from the group consisting of lanthanum, yttrium, gadolinium, ytterbium, and zirconium, free of oxides of an element selected from the group consisting of lanthanum, yttrium, gadolinium, ytterbium, and zirconium, and/or free of an ingredient selected from the group consisting of tin oxide, lithium oxide, fluoride, magnesium, and $SO_3$.

10. The optical glass filter according to claim 1, wherein the ratio of amounts of NiO to CoO that is at least 4.

11. The optical glass filter according to claim 1, wherein the ratio of amounts of NiO to CoO that is at least 4.3.

12. The optical glass filter according to claim 1, wherein the ratio of amounts of NiO to CoO does not exceed 14.

13. The optical glass filter according to claim 1, wherein the ratio of amounts of NiO to CoO does not exceed 8.

14. The optical glass filter according to claim 1, wherein the ratio of amounts of NiO to CoO does not exceed 6.

15. The optical glass filter according to claim 1, wherein the ratio of amounts of NiO to CoO does not exceed 5.7.

16. The optical glass filter according to claim 1, wherein the ratio of amounts of NiO to CoO does not exceed 5.

17. The optical glass filter according to claim 1, wherein the glass filter comprises a streak class according to ISO 10110 of 4 or better.

18. A process for the production of a filter glass according to claim 1, comprising melting of a mixture of the composition.

19. An optical glass filter, comprising a filter glass including following composition (in % by weight, based on oxides):

| | |
|---|---|
| $SiO_2$ | 45-75; |
| $B_2O_3$ | 0-5; |
| $Al_2O_3$ | 0-5; |
| $Na_2O$ | 0.3-15; |
| $K_2O$ | 2-20; |
| CaO | 0-15; |
| BaO | 0-15; |
| $TiO_2$ | 0.01-5; |
| CoO | 0.01-3; |
| NiO | 0.1-8; and |
| PbO | <7, and | a ratio of amounts of NiO to CoO that is at least is at least 4.3 and does not exceed 5.

* * * * *